United States Patent
Batke et al.

(10) Patent No.: US 8,131,827 B2
(45) Date of Patent: Mar. 6, 2012

(54) PLC WITH WEB-ACCESSIBLE PROGRAM DEVELOPMENT SOFTWARE

(75) Inventors: Brian A. Batke, Novelty, OH (US); Gary W. Baczkowski, Seven Hills, OH (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2597 days.

(21) Appl. No.: 09/967,124

(22) Filed: Sep. 28, 2001

(65) Prior Publication Data

US 2002/0169850 A1 Nov. 14, 2002

Related U.S. Application Data

(60) Provisional application No. 60/289,853, filed on May 9, 2001.

(51) Int. Cl.
*G06F 15/177* (2006.01)
(52) U.S. Cl. ........................................ 709/220
(58) Field of Classification Search .................. 709/218, 709/220; 700/83, 86, 90; 717/100, 109
See application file for complete search history.

(56) References Cited

U.S. PATENT DOCUMENTS

| | | | |
|---|---|---|---|
| 5,805,442 A | 9/1998 | Crater et al. | |
| 5,975,737 A | 11/1999 | Crater et al. | |
| 5,982,362 A | 11/1999 | Crater et al. | |
| 6,061,603 A * | 5/2000 | Papadopoulos et al. | 700/83 |
| 6,151,625 A | 11/2000 | Swales et al. | |
| 6,282,454 B1 | 8/2001 | Papadopoulos et al. | |
| 6,588,673 B1 * | 7/2003 | Chan et al. | 235/492 |
| 6,640,140 B1 * | 10/2003 | Lindner et al. | 700/18 |
| 6,799,077 B1 * | 9/2004 | Hauet | 700/2 |
| 6,947,798 B2 * | 9/2005 | Bronikowski et al. | 700/90 |
| 2001/0003804 A1 | 6/2001 | Papadopoulos et al. | |
| 2001/0014833 A1 | 8/2001 | Brault | |

FOREIGN PATENT DOCUMENTS

| | | |
|---|---|---|
| EP | 0917034 A1 | 5/1999 |
| WO | WO 99/13418 A1 | 3/1999 |
| WO | WO 01/12374 A1 | 2/2001 |
| WO | WO 01/67190 A2 | 9/2001 |
| WO | WO 01/67190 A3 | 9/2001 |

OTHER PUBLICATIONS

XP-000920447, Schneider, "Fit fur die Internet-Automatisierung", Messen Und Prufen, Iva International, Muchen, DE, vol. 35, No. 7/8, Jul. 1999, p. 88, 90.

* cited by examiner

*Primary Examiner* — Hussein A. Elchanti
(74) *Attorney, Agent, or Firm* — Boyle Fredrickson, S.C.; R. Scott Speroff; John M. Miller

(57) ABSTRACT

An industrial control system that is for controlling an industrial process and that can be accessed via the Internet is disclosed. The industrial control system includes a plurality of I/O devices exchanging signals with the industrial process, and a web access module including a web server coupled to a PLC. The web server is capable of being coupled to at least one remote device via the Internet, and the PLC is coupled to the I/O devices. The web access module further includes programming software that can be utilized to generate a controller program for at least one of the PLC and one of the I/O devices. The web server is capable of providing the programming software onto the Internet for transmission to the remote device, so that the remote device is able to generate the controller program.

20 Claims, 2 Drawing Sheets

PLC WITH WEB-ACCESSIBLE PROGRAM DEVELOPMENT SOFTWARE

CROSS-REFERENCE TO RELATED APPLICATIONS

This application claims the benefit of U.S. provisional patent application No. 60/289,853, filed on May 9, 2001.

STATEMENT REGARDING FEDERALLY SPONSORED RESEARCH OR DEVELOPMENT

--

FIELD OF THE INVENTION

The present invention relates generally to industrial control systems for industrial processes, and in particular to an industrial control system that allows remote terminals having limited processing power and/or memory to access the industrial control system via the web.

BACKGROUND OF THE INVENTION

Industrial control systems used to control and monitor industrial processes often employ programmable logic controllers (PLCs). PLCs are special purpose computers that operate based upon stored control programs and typically read inputs and provide outputs to the controlled industrial processes based upon the logic of their controller programs. The processing power and memory capabilities of PLCs have rapidly grown in recent years.

PLCs differ from conventional computers in two major respects. First, PLCs operate to produce highly reliable and predictable control outputs. The architecture and programming of PLCs are designed so as to provide predictable maximum response times, as well as a reduction in errors caused by race conditions and sensitive detection of hardware and communication errors. Second, PLCs also differ from conventional computers in that PLCs are highly customizable so as to fit the demands of the particular industrial processes being controlled.

In some instances, it is desirable for users to be able to program or modify controller programs of the PLCs of the industrial control systems by way of remote human machine interfaces. Conventional industrial control systems allow for communications between the PLCs and remote human machine interfaces such as computer terminals by way of proprietary communication links or dedicated phone lines. Typically, to allow for such communications, the remote users are provided with proprietary software for installation on the remote terminals. The proprietary software is specialized both in that it allows for programming of the controller programs, and in that it allows for appropriate communications in accordance with the proprietary format.

Although such proprietary software provides the remote user with the capability of remotely accessing an industrial control system and effecting changes to the controller programs employed in the control system, the use of such software has several drawbacks. First, the software typically requires significant memory and processing power for its installation and operation at a remote terminal. Additionally, the software must be delivered to (or otherwise obtained by) and installed by the user of the remote terminal.

Further, it is often the case that the software must be updated from time to time, such that the user must repeatedly obtain and install new software. As updates to the software are made over time, care must be exercised by the remote user so that the proper versions of the software are used in association with the controller programs. In particular, this is the case where the controller programs have different versions that were created using different versions of the software.

Therefore, it would be advantageous if a new industrial control system was developed that allowed for communications between the industrial control system and remote devices, particularly to allow for the remote programming and modifying of controller programs, without the separate, physical provision of proprietary software for installation at the remote terminals. It would also be advantageous if the industrial control system was designed to communicate with remote terminals in such a manner that it was not necessary for the remote terminals to have large amounts of processing power and/or memory. It would further be advantageous if updates in the programming software employed to create controller programs and version changes in the controller programs were automatically accounted for in the operation of the remote terminals. It would additionally be advantageous if the remote terminals could be employed to create or modify the controller programs of a variety of different control devices of the industrial control system, including PLCs.

BRIEF SUMMARY OF THE PREFERRED EMBODIMENT

The present inventors have developed a new industrial control system that communicates with remote computer terminals or other remote devices by way of the Internet or World Wide Web (or simply the "web"), and allows for remote programming and modifying of controller programs by providing both controller programs and programming software to the remote devices via the web. The industrial control system includes a web access module having both a web server and a PLC, in addition to other control devices such as input/output (I/O) modules that are employed to control an industrial process. The web access module stores controller programs that are implemented on the PLC and/or the other control devices, and the web access module also stores programming software that can be employed to create or modify the controller programs. The web server allows for information concerning both the controller programs and the programming software used to create or modify the controller programs to be provided over the web to the remote devices, at which controller programs can be newly created or modified. Upon creating or modifying controller programs, the remote devices can provide the generated programs to the web server via the web.

The industrial control system can be configured to provide different amounts or types of programming software depending upon the type of remote device that is making a given request. Where controller programs stored on the web access module have multiple versions or have varied with time, for example because of updates or changes to elements of the industrial control system, the web access module associates corresponding versions of the programming software with those versions of the controller programs. Then, when the controller programs are provided to the remote devices by the web server, the web server also sends the appropriate versions of the programming software corresponding to those controller programs.

In particular, the present invention relates to an industrial control system for controlling an industrial process. In the industrial control system includes a plurality of I/O devices exchanging signals with the industrial process, and a web access module including a web server coupled to a PLC. The web server is capable of being coupled to at least one remote device via the Internet, and the PLC is coupled to the I/O devices. The web access module further includes programming software that can be utilized to generate a controller program for at least one of the PLC and one of the I/O devices. The web server is capable of providing the programming software onto the Internet for transmission to the remote device, so that the remote device is able to generate the controller program.

The present invention further relates to, in an industrial control system having a plurality of control devices that operate to monitor and control an industrial process, a web access module coupled to the plurality of control devices. The web access module includes a memory means for storing programming software capable of being utilized to generate a controller program for operation on at least one of the web access module and one of the control devices. The web access module additionally includes a processor means coupled to the memory means, where the processor means is for sending the programming software to a remote device and receiving communications concerning the controller program from the remote device. The controller program is generated at the remote device through the use of the programming software, and the web access module is further adapted to allow for communications between the processor means and the remote device by way of the Internet.

The present invention additionally relates to a method of generating a controller program for at least one control device of an industrial control system that monitors and controls an industrial process. The method includes providing a web server within the industrial control system, where the web server is capable of communicating with at least one remote device via the Internet. The method also includes obtaining programming software capable of being used to generate the controller program, providing the programming software onto the Internet for transmission to the at least one remote device, and receiving from the at least one remote device the generated controller program.

DETAILED DESCRIPTION OF THE PREFERRED EMBODIMENT

Figure 1:
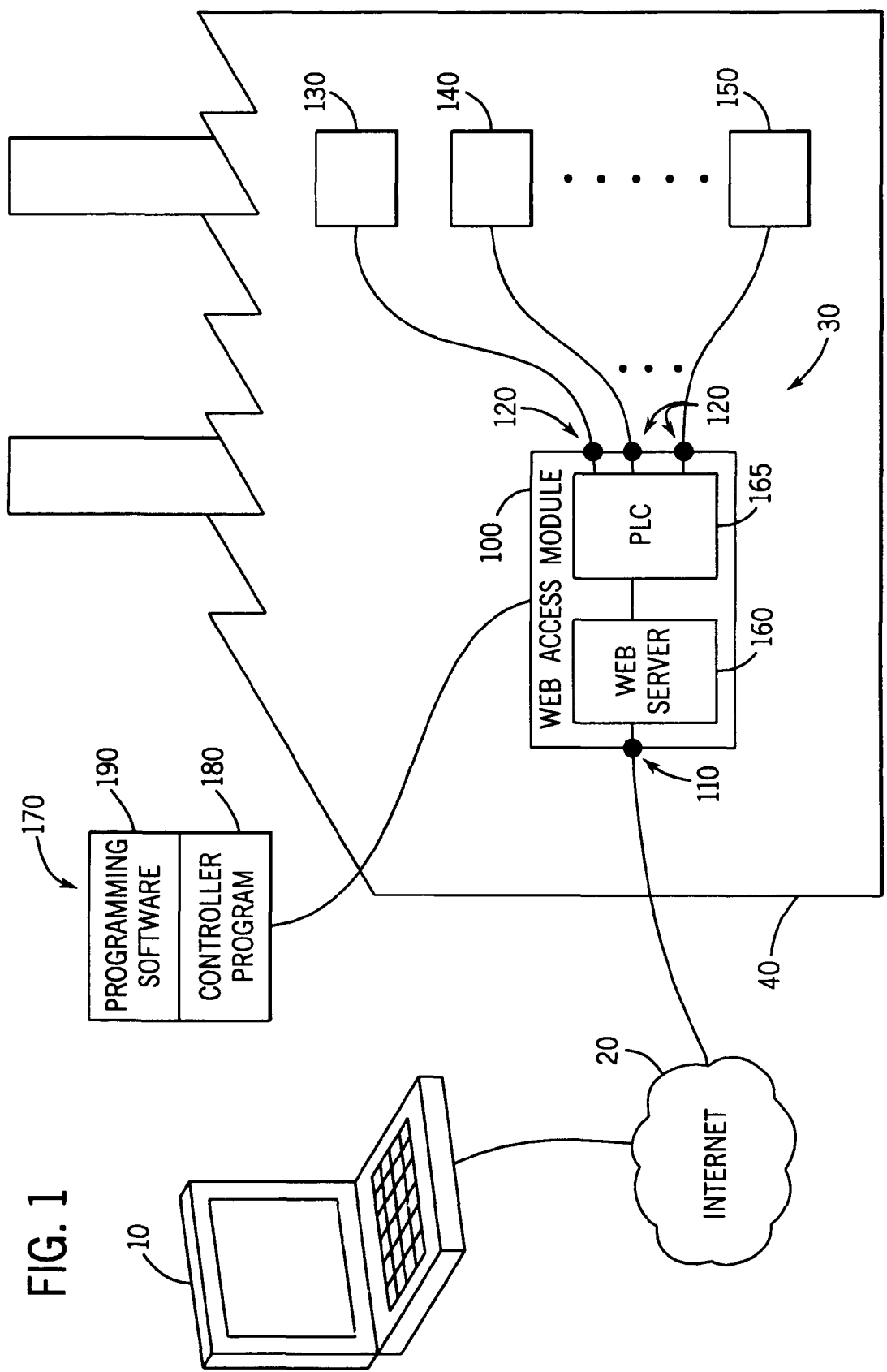
FIG. 1 is a schematic diagram showing an exemplary industrial control system including a web access module that is capable of communication with one or more remote terminals via the Internet, where the web access module stores programming software that can be provided to the remote terminals and used to create or modify controller programs used by the industrial control system.

Referring to FIG. 1, in accordance with the present invention, one or more remote devices 10, such as personal computers having Internet browser programs (e.g., Internet Explorer by Microsoft Corp. of Redmond, Wash.), are coupled by way of the Internet 20 to an industrial control system 30 that controls an industrial process occurring within a factory 40 or other setting. The industrial control system 30 includes a web access module 100 coupled to the Internet 20 by way of an Internet interface 110. The industrial control system 30 further includes one or more control devices, shown as control devices 130, 140 and 150, that are coupled to the web access module by respective ports of a control network interface 120. The control devices 130-150 can be a variety of different types of devices, including input/output (I/O) modules, motor controllers, and other devices. In certain embodiments, one or more of the control devices 130-150 are programmable logic controllers (PLCs). Also, depending upon the embodiment, the various control devices 130-150 can be coupled by a communications link, such as a communications databus (not shown). Each of the control devices 130-150 receives data from and/or provides control commands to one or more elements or aspects of the industrial process being controlled by the industrial control system 30.

As shown, the web access module 100 includes, in the preferred embodiment, a web server 160 and a PLC 165. The web server 160 is coupled between the Internet interface 110 and the PLC 165, which, in turn, is coupled between the web server 160 and the control network interface 120. Depending upon the embodiment, a different type of controller can be used instead of the PLC 165. Also, in certain embodiments, the PLC or other controller acts as the web server 160 such that the two devices actually become a single device. Regardless of the embodiment, the web access module 100 includes the ability to provide web server functionality so that the one or more remote devices 10 can access and obtain information from the web access module by way of the Internet 20. The PLC 165 or other controller operates to control, influence or otherwise interact with the control devices 130-150 and thereby with the industrial process by way of one or more controller programs 180.

The controller program(s) 180 is (or are) stored within a memory 170 of the web access module 100. The memory 170 can exist as a separate element of the web access module 100, can be a part of either the web server 160 or the PLC 165, or can even exist outside of the web access module 100 at a different location. For example, the memory 170 can exist at a remote location and be coupled to the web access module 100 by way of the Internet 20.

Although in the embodiment shown, the PLC 165 of the web access module 100 includes a specific controller program 180 that directs the operation of the PLC 165, in alternate embodiments, one or more of the various control devices 130-150 can have their own respective controller programs that govern the operation of those control devices in relation to one another, the controlled industrial process and the web access module 100. The controller programs at the control devices can be stored in respective memories at those control devices or at other locations. In certain embodiments, only one or more of the control devices 130-150 will have controller programs and the web access module 100 will not have its own controller program. In embodiments where one or more of the control devices have their own controller programs, these controller programs can be accessed by or otherwise provided to the web access module 100.

In accordance with the present invention, remote users operating one or more remote devices 10 can access the controller program 180 of the PLC 165 (or other controller programs associated with the control devices) by way of the Internet 20 and the web server 160. When accessing the controller program 180, the remote users not only obtain the controller program 180 but also obtain related programming software 190 that is used by the browser programs of the remote devices 10 to program or otherwise interact with the controller program 180. That is, the remote devices 10 download from the web server 160 not only the controller program 180 itself, but also the application that allows remote users to generate or create new controller programs, as well as modify existing controller programs.

As with the controller program 180, the programming software 190 is stored in the memory 170 of the web access module 100 or particularly within the web server 160 or the PLC 165 of the web access module, although in alternate embodiments, the memory 170 can be located elsewhere. In the preferred embodiment, the memory 170 that stores the controller program 180 is the same memory that stores the programming software 190, that is, there is a single memory device that stores both the controller programs and the related programming software together. In alternate embodiments, the programming software 190 can be stored at a different location than the respective controller program 180, although the web access module 100 acts to associate the proper programming software with the appropriate controller program when such controller program is accessed by a remote user.

By storing (or at least associating) the appropriate programming software 190 with each controller program 180, and providing such programming software with each controller program as that controller program is downloaded to remote users via the Internet 20, the present invention provides significant advantages. In particular, for those remote devices 10 that are incapable of storing or otherwise processing complicated programming software for generating or modifying controller programs, simple versions of the programming software can be stored at the web access module 100 and be downloaded by the remote devices 10, thus enabling the remote devices to generate and/or modify the controller programs. Further, in cases where the programming software 190 is updated from time to time, it is unnecessary to send hard copies of the new versions of the programming software 190 physically to the remote users, since the remote users are now able to download new versions of the programming software directly by way of the Internet 20 from the web access module 100.

In cases where the programming software 190 is updated multiple times, the industrial control system 30 can be designed to provide only a limited number of updated versions of the programming software 190 to a particular remote device 10 without receiving payment from the remote user associated with the remote device. In certain embodiments, every downloading of programming software 190 requires payment by the user. Such payments can be transacted by way of standard techniques known in the art, including the providing of credit card numbers from the remote device 10 to the web access module 100, which then interacts with a credit card company to effect payment. In certain other embodiments, core programming software 190 can be downloaded by remote devices 10 from the web access module 100, but additional software (including additional specialized updates) must be obtained from other sources, such as remote web servers that are accessed by the remote devices also by way of the Internet 20 as well.

In further embodiments, the controller program 180 can have multiple versions, each of which may have been generated or created by way of different versions of the programming software 190. In such cases, the memory 170 stores the various versions of the controller program 180 in association with the respective versions of the programming software 190. By storing these combinations of the controller program versions and the programming software versions, remote users at remote devices 10 who which to access a particular version of the controller program 180 will always be provided with the correct version of the programming software 190 that will allow them to view and modify that particular version of the controller program 180.

As discussed above, the control devices 130-150 can also have respective controller programs in addition to or instead of the controller program 180 associated with the PLC 165. In such embodiments, corresponding programming software 190 can be stored at each of these respective control devices with their respective controller programs, or can be stored separately from the controller programs. In certain embodiments, the programming software relating to the controller programs of the various control devices 130-150 is stored at the web access module 100 even though the controller programs are stored at the respective control devices. In each of these embodiments, the web access module 100 is capable of obtaining the requested controller programs in response to requests from the remote devices 10 and obtaining the corresponding programming software, and then sending the programming software in addition to the controller programs to the remote devices 10.

Figure 2:
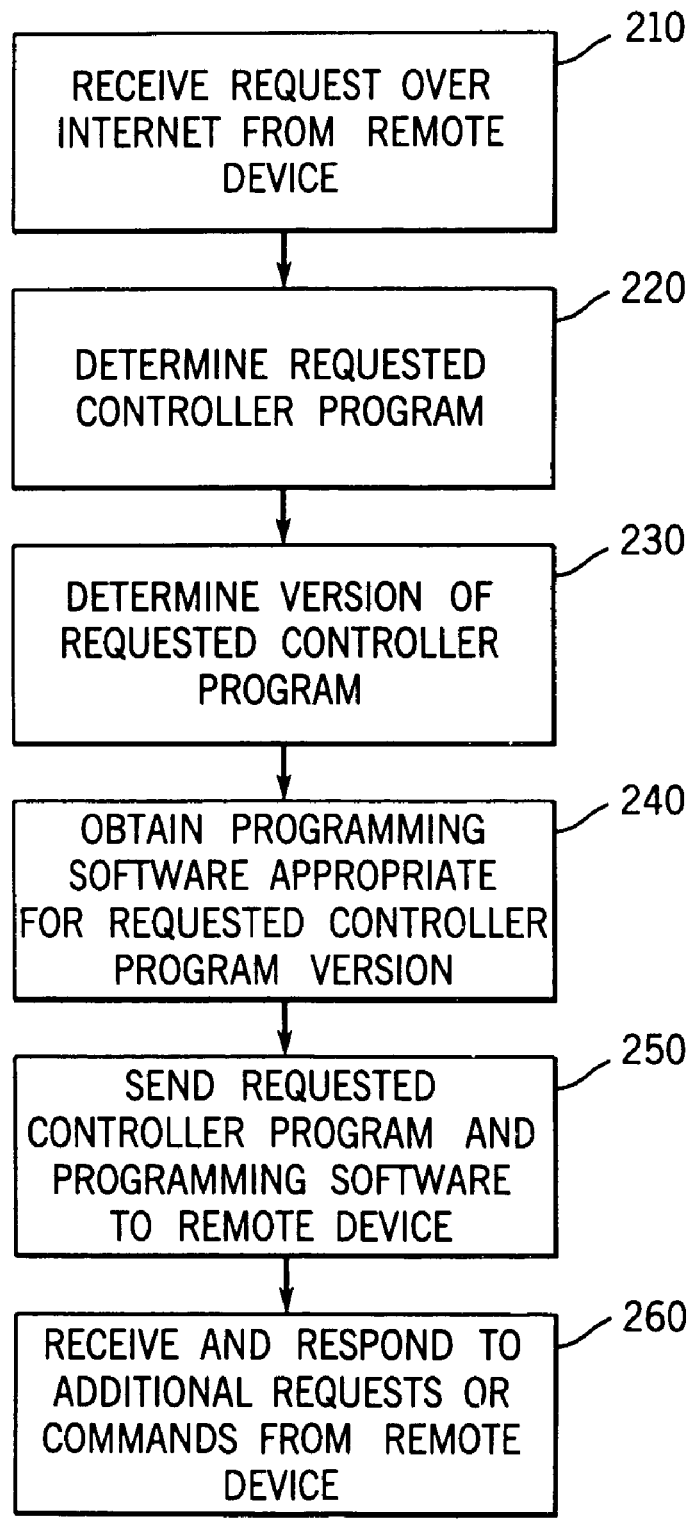
FIG. 2 is a flow chart showing exemplary steps of operation of one embodiment of the industrial control system of FIG. 1, in which both a controller program and programming software is communicated over the Internet to a remote terminal.

Referring to FIG. 2, an exemplary set of steps of operation of the industrial control system 30 begins with step 210, at which the industrial control system 30 and particularly the web access module 100 receives a request provided over the Internet 20 from a remote device 10. At step 220, the web access module 100 and in particular the web server 160 analyzes the request and determines the requested controller program, for example, determines that the requested controller program is the controller program 180 of the PLC 165. At step 230, the web server 160 further determines the particular version of the controller program that has been requested in such circumstances where multiple versions of the controller program exist. In certain embodiments, the web access module 100 is also capable of determining at steps 220-230 whether the request from the remote device 10 is a request to generate or create an entirely new controller program for the PLC 165 or one of the control devices 130-150.

Next, at step 240, the web access module 100 obtains the programming software (e.g., the programming software 190) that is appropriate for creating, generating, modifying or otherwise interacting with the requested controller program or controller program version. The programming software is obtained from the memory device 170 or from whatever other memory device is storing the relevant programming software. If an entirely new controller program is going to be generated, programming software appropriate for such new creation of the controller program is obtained.

At step 250, the requested controller program and appropriate programming software is then provided from the web server 160 of the web access module 100 to the remote device 10 that originally made the request. The remote device 10 is then capable of modifying the controller program. In the case where an entirely new controller program is going to be generated at the remote device 10, the programming software appropriate for such creation of the new controller program is the software that is sent to the remote device 10, and either no controller program or only a basic controller program framework is sent to the remote device. The remote device 10 then employs the programming software to generate the new controller program.

In certain embodiments, it is allowable for the remote device 10 to store in its own memory a copy of newly-generated controller programs. Also, in embodiments where controller programs can have multiple versions, the programming software sent by the web server 160 onto the Internet 20 to the remote device 10 matches the version of the controller program being sent.

At step 260, the web server 160 is capable of receiving and responding to additional requests or commands from the remote device 10. Such requests or commands can include submissions of completed new or modified controller programs, requests for assistance in creating or modifying controller programs, requests for additional software or directions as to how to obtain necessary additional software (e.g., software that can be obtained at different web servers by way of the Internet 20), and other information.

In cases where payments must be obtained from the remote users at the remote devices 10 before requested programming software is sent to those remote devices 10, additional steps concerning payment requests and/or the receipt of payment information such as credit card information are also executed by the industrial control system 30. For example, a payment request can be issued to a remote device by the web server 160 after step 240, upon determining what programming software is appropriate for creating or modifying the requested controller program version, prior to the sending of the requested information at step 250.

The web access module 100, and in particular the web server 160, operates in conjunction with the Internet 20 by way of conventional communications techniques and protocols. In one embodiment, the web server 160 interacts with the Internet 20 by way of the Internet interface 110 using the Ethernet media access protocol (MAC) and also by way of the transfer control protocol/Internet protocol (TCP/IP). In alternate embodiments, other formats or protocols can be utilized. Further, the exact application-level information being sent between the remote devices 10 and the web server 160 will vary depending upon the remote devices, and in particular will vary depending upon the programs such as browser programs that those remote devices employ.

In certain embodiments, the web server 160 is capable of interacting with a variety of different types of web browser programs and other programs employed by remote devices. The web server 160 is capable of determining at any given time what type of program is being utilized by a given remote device, as well as the processing power and memory capabilities or limitations of the remote device. Using this information, the web server 160 tailors its operation in relation to that remote device accordingly. For example, lesser amounts of programming software or different versions of programming software will be provided to remote devices 10 that have less processing power or memory capabilities than to remote devices that have greater capabilities in these regards.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. An industrial control system for controlling an industrial process comprising:

a plurality of I/O devices capable of exchanging signals with the industrial process;

a web access module including a web server coupled to a programmable logic control (PLC), wherein the web server is capable of being coupled to at least one remote device via the Internet, and wherein the PLC is coupled to the I/O devices to execute a controller program to control the industrial process using the signals;

wherein the web access module further includes program development software including programming software that can be utilized to generate or modify the controller program for at least one of the PLC and one of the I/O devices, and wherein the web server is capable of providing the programming software onto the Internet for transmission to the remote device, so that the remote device is able to generate or modify the controller program.

2. The industrial control system of claim 1, wherein the PLC and the web server are one of: (a) implemented in a single computer executing two programs; and (b) implemented respectively in two different computers that are in communication via a communication link.

3. The industrial control system of claim 1, wherein the PLC executes the controller program, once the remote device has generated the controller program using the programming software and the controller program has been returned to the web access module from the remote device.

4. The industrial control system of claim 1, wherein the program development software is stored within at least one of the PLC, the web server, a memory device within the web access module, a memory device within at least one of the I/O devices and a remote memory device.

5. The industrial control system of claim 4, wherein an existing controller program is stored within at least one of the PLC, the web server, a memory device within the web access module, a memory device within at least one of the I/O devices and a remote memory device.

6. The industrial control system of claim 5, wherein the web server is capable of sending the existing controller program along with the programming software to the remote device by way of the Internet, so that the remote device is able to modify the existing controller program to generate the controller program.

7. The industrial control system of claim 6, wherein it is allowable for the remote device to remotely store a backup copy of the controller program generated based upon the existing controller program.

8. The industrial control system of claim 6, wherein the program development software, includes a plurality of versions of programming software, and wherein the existing controller program and a plurality of additional existing controller programs are stored in association with the respective versions of the programming software that were employed to generate the respective existing controller programs.

9. The industrial control system of claim 6, wherein the programming software that is sent along with the existing controller program is of a version that was used to generate the existing controller program.

10. The industrial control system of claim 1, wherein the web server is coupled to the Internet by way of an Internet interface, and wherein the PLC is coupled to the I/O devices by way of a control network interface.

11. The industrial control system of claim 1, wherein the web server provides the program development software to the remote device in response to a request received from the remote device.

12. The industrial control system of claim 1, wherein the web server provides onto the Internet, in response to a request received from the remote device, information indicative of another Internet-accessible location at which the remote device, can obtain desired program development software.

13. The industrial control system of claim 1 wherein, prior to the sending of the program development software to the remote device, the web access interface must receive a signal indicative of at least one of a payment agreement and a credit card number from the remote device.

14. The industrial control system of claim 13, wherein the signal must be received only when the program development software to be sent is a new version of the programming software that has not earlier been communicated to the remote device.

15. In an industrial control system having a plurality of control devices that operate to monitor and control an industrial process, a web access module coupled to the plurality of control devices, the web access module comprising:
- a memory means for storing program development software including programming software utilized to generate a controller program for operation on at least one of the web access module and one of the control devices; and
- a processor means coupled to the memory means, the processor means for sending the program development software to a remote device and receiving communications concerning the controller program from the remote device, wherein the controller program is generated at the remote device through the use of application software included with the program development software,
- wherein the web access module is further adapted to allow for communications between the processor means and the remote device by way of the Internet.

16. The web access module of claim 15, wherein the processor means includes a web server and a PLC, and wherein an existing controller program is stored by the memory means in association with a particular version of the programming software.

17. The web access module of claim 16, wherein the control devices are selected from the group consisting of I/O modules, motor controllers, and PLCs.

18. A method of generating a controller program for at least one control device of an industrial control system that monitors and controls an industrial process, the method comprising:
- providing a web server within the industrial control system, wherein the web server is capable of communicating with at least one remote device via the Internet;
- obtaining program development software including programming software capable of being used to generate the controller program;
- providing the program development software onto the Internet for transmission to the at least one remote device; and
- receiving from the at least one remote device the generated controller program.

19. The method of claim 18, further comprising: obtaining an existing controller program from a memory device on which the existing controller program is stored, the program development software being associated with the existing controller program;
- providing the existing controller program onto the Internet for transmission to the at least one remote device; and
- after receiving the generated controller program from the at least one remote device, storing the generated controller program on the memory device in association with a version of the programming software that was utilized to generate that controller program.

20. The method of claim 19, wherein the web server and a PLC are included within a web access module, wherein the PLC is coupled to a plurality of additional control devices within the industrial control system, and wherein the controller program is utilized by at least one of the PLC and one of the additional control devices.

* * * * *